(12) United States Patent
Wentink

(10) Patent No.: US 9,992,738 B2
(45) Date of Patent: Jun. 5, 2018

(54) PHYSICAL LAYER POWER SAVE FACILITY WITH RANDOM OFFSET

(75) Inventor: Maarten Menzo Wentink, Naarden (NL)

(73) Assignee: QUALCOMM Incorporated, San Diego, CA (US)

(*) Notice: Subject to any disclaimer, the term of this patent is extended or adjusted under 35 U.S.C. 154(b) by 753 days.

(21) Appl. No.: 13/298,059

(22) Filed: Nov. 16, 2011

(65) Prior Publication Data

US 2012/0300684 A1    Nov. 29, 2012

Related U.S. Application Data

(60) Provisional application No. 61/414,872, filed on Nov. 17, 2010.

(51) Int. Cl.
*G08C 17/00* (2006.01)
*H04W 52/02* (2009.01)

(52) U.S. Cl.
CPC ......... *H04W 52/0216* (2013.01); *Y02D 70/00* (2018.01); *Y02D 70/142* (2018.01); *Y02D 70/164* (2018.01)

(58) Field of Classification Search
USPC .......................................... 370/311, 329, 330
See application file for complete search history.

(56) References Cited

U.S. PATENT DOCUMENTS

| 5,790,952 A * | 8/1998 | Seazholtz et al. ......... 455/432.1 |
| 6,657,997 B1 | 12/2003 | Lide et al. |
| 7,257,095 B2 | 8/2007 | Liu |
| 8,059,609 B2 | 11/2011 | Kim et al. |

(Continued)

FOREIGN PATENT DOCUMENTS

| CN | 1601997 A | 3/2005 |
| CN | 101047587 A | 10/2007 |

(Continued)

OTHER PUBLICATIONS

Bernard Aboa: "Virtual Access Points", IEEE P802.11 Wireless LANS, XX, XX, No. 802.11-03/154r1, May 22, 2003 (May 22, 2003), pp. 1-13, XP002425027.

(Continued)

*Primary Examiner* — Mohammad Anwar
*Assistant Examiner* — Angel Brockman
(74) *Attorney, Agent, or Firm* — Patterson & Sheridan, LLP

(57) ABSTRACT

Certain aspects of the present disclosure provide methods and apparatus for using a random offset to achieve power savings. For certain aspects, a Basic Service Set (BSS)-specific offset may be added to the (partial) association identifier (AID) prior to entering the partial AID into a 9-bit field of the physical layer (PHY) header (e.g., bits 13-21 of the $N_{STS}$ field). The BSS-specific offset may be selected randomly by an access point (AP) and signaled to the associated stations (STAs) through the association response, or the offset may be communicated to the STA via other means. In this manner, the value in the 9-bit field for downlink transmissions may, with high likelihood, be different from one BSS to the next, allowing STAs to remain awake only when a frame is being transmitted to them.

67 Claims, 12 Drawing Sheets

(56) References Cited

U.S. PATENT DOCUMENTS

| | | | |
|---|---|---|---|
| 8,126,998 | B2 | 2/2012 | Ikeda |
| 8,315,346 | B2 | 11/2012 | Kim et al. |
| 8,467,346 | B2* | 6/2013 | Xiao .............................. 370/330 |
| 8,472,383 | B1 | 6/2013 | Banerjea et al. |
| 8,971,213 | B1* | 3/2015 | Hart ........................ H04L 12/28 370/255 |
| 2003/0169769 | A1 | 9/2003 | Ho et al. |
| 2006/0045035 | A1 | 3/2006 | Liu |
| 2007/0217352 | A1 | 9/2007 | Kwon |
| 2008/0013610 | A1* | 1/2008 | Varadarajan ......... H04B 7/0417 375/221 |
| 2008/0075028 | A1* | 3/2008 | Park et al. ..................... 370/311 |
| 2009/0268653 | A1 | 10/2009 | Itagaki et al. |
| 2010/0046457 | A1 | 2/2010 | Abraham et al. |
| 2010/0062798 | A1* | 3/2010 | Poe et al. ....................... 455/509 |
| 2010/0177656 | A1 | 7/2010 | Kim et al. |
| 2010/0177757 | A1 | 7/2010 | Kim et al. |
| 2010/0226315 | A1 | 9/2010 | Das et al. |
| 2010/0260138 | A1 | 10/2010 | Liu et al. |
| 2010/0260159 | A1 | 10/2010 | Zhang et al. |
| 2010/0293378 | A1 | 11/2010 | Xiao et al. |
| 2011/0002319 | A1 | 1/2011 | Husen et al. |
| 2011/0064040 | A1* | 3/2011 | Kim et al. ..................... 370/329 |
| 2011/0110293 | A1 | 5/2011 | Hart et al. |
| 2011/0141932 | A1* | 6/2011 | Iwao et al. ..................... 370/252 |
| 2011/0188387 | A1* | 8/2011 | Das et al. ...................... 370/252 |
| 2011/0188424 | A1 | 8/2011 | Ramamurthy et al. |
| 2012/0039266 | A1* | 2/2012 | Abraham et al. ............. 370/329 |
| 2012/0044925 | A1 | 2/2012 | Lee et al. |
| 2012/0287850 | A1 | 11/2012 | Wentink |
| 2013/0343240 | A1* | 12/2013 | Funakubo et al. ............ 370/280 |

FOREIGN PATENT DOCUMENTS

| | | |
|---|---|---|
| CN | 101056258 A | 10/2007 |
| EP | 1821419 A2 | 8/2007 |
| JP | 2007221393 A | 8/2007 |
| JP | 2009509469 A | 3/2009 |
| JP | 2013513284 A | 4/2013 |
| JP | 2013523005 A | 6/2013 |
| KR | 100819285 B1 | 4/2008 |
| KR | 20100112176 A | 10/2010 |
| KR | 20150013050 A | 2/2015 |
| RU | 2009101269 A | 7/2010 |
| WO | 9006566 A1 | 6/1990 |
| WO | 2000016491 | 3/2000 |
| WO | WO-2007038118 A2 | 4/2007 |
| WO | WO-2007105928 A1 | 9/2007 |
| WO | WO-2007109634 A1 | 9/2007 |
| WO | 2007144688 A1 | 12/2007 |
| WO | 2008075179 A2 | 6/2008 |
| WO | WO-2009109894 A1 | 9/2009 |
| WO | WO-2011068387 A2 | 6/2011 |
| WO | WO-2011115408 A2 | 9/2011 |

OTHER PUBLICATIONS

IEEE 802.11, IEEE Standard for Information technology—Telecommunications and information exchange between systems—Local and metropolitan area networks—Specific requirements; Part 11: Wireless LAN Medium Access Control (MAC) and Physical Layer (PHY), 2007.

IEEE 802.11n-2009, "IEEE Standard for Information technology—Telecommunications and information exchange between systems—Local and metropolitan area networks—Specific requirements", Part 11: Wireless LAN Medium Access Control (MAC) and Physical Layer (PHY) Specifications, Amendment 5: Enhancements for Higher Throughput, IEEE Standard, IEEE, Piscataway, NJ, USA, Oct. 29, 2009 (Oct. 29, 2009), pp. C1-502, XP017604244.

International Search Report and Written Opinion—PCT/US2011/061206—ISA/EPO—dated May 18, 2012.

LG Electronics Inc. (Kang B., et al.), "PHY Power Saving Features For 11ac, IEEE 802.11-10/0785r1", Jul. 14, 2010, slide 14, URL, https://mentor.ieee.org/802.11/dcn/10/11-10-0785-01-00ac-phy-power-saving-features-for-11ac.ppt.

QUALCOMM Incorporated (Sampath H., et al.), "802.11 ac Preamble, IEEE 802.11-10/876r0," Jul. 13, 2010, slide 7—slide 9, URL, https://mentor.ieee.org/802.11/dcn/10/11-10-0876-00-00ac-11ac-preamble.pptx.

Stacey R., et al., "IEEE P802.11 Wireless LANs—Specification Framework for TGac," IEEE 802.11-09/0992r18, Sep. 2010, 44 Pages.

Nee R.V., et al., "VHT-SIG-A2 Fields and Order (IEEE 802.11-10/1052r0)", Sep. 9, 2010, pp. 1-9, XP055010545, Retrieved from the Internet: URL: https://mentor.ieee.org/802.11/dcn/10/11-10-1052-00-00ac-vht-sig-a-and-vht-sig-b-field-structure.ppt &ei=XwCoTsKnOcyn8QPZ2uilDw &usg=AFWCNGeUNTNKReNDMAPrylOPlh7MvHW&cad=rja [retrieved on Oct. 26, 2011].

Kim J., et al., "GroupID Concept for Downlink MU-MIMO Transmission", Jan. 18, 2010 (Jan. 18, 2010), pp. Slide 1-Slide 8, XP002645417, Retrieved from the Internet: URL:https://mentor.ieee.org/.../11-10-0073-00-00ac-group-id-concept-for-dl-mu-mimo.ppt [retrieved on Jun. 28, 2011].

* cited by examiner

VHT-SIG-A1

| Bit | Field | Bit Allocation | Description |
|---|---|---|---|
| B0-B1 | BW | 2 | Set to 0 for 20 MHz, 1 for 40 MHz, 2 for 80 MHz, 3 for 160 MHz and 80+80 MHz |
| B2 | Reserved | 1 | Reserved for possible expansion of BW field. Set to 1. |
| B3 | STBC | 1 | Set to 1 if all streams have space time block coding and set to 0 otherwise |
| B4-B9 | Group ID | 6 | A value of 63 (all ones) indicates:<br>    A single user transmission<br>    A transmission where the group membership has not yet been established<br>    A transmission that needs to bypass a group (e.g. broadcast) |
| B10-B21 | $N_{STS}$ | 12 | For MU: 3 bits/user with maximum of 4 users (user u uses bits B(10+3*u)-B(12+3*u), u=0,1,2,3)<br>    Set to 0 for 0 space time streams<br>    Set to 1 for 1 space time stream<br>    Set to 2 for 2 space time streams<br>    Set to 3 for 3 space time streams<br>    Set to 4 for 4 space time streams<br>For SU:<br>B10-B12<br>    Set to 0 for 1 space time stream<br>    Set to 1 for 2 space time streams<br>    Set to 2 for 3 space time streams<br>    Set to 3 for 4 space time streams<br>    Set to 4 for 5 space time streams<br>    Set to 5 for 6 space time streams<br>    Set to 6 for 7 space time streams<br>    Set to 7 for 8 space time streams<br>B13-B21<br>    Partial AID: 9 LSB bits of AID plus BSS-specific offset |
| B22-B23 | Reserved | 2 | All ones |

FIG. 7A

VHT-SIG-A2

| Bit | Field | Bit Allocation | Description |
|---|---|---|---|
| B0-B1 | Short GI | 2 | B0:<br>Set to 0 if short guard interval is not used in the Data field.<br>Set to 1 if short guard interval is used in the Data field.<br>B1:<br>Set to 1 if short guard interval is used and $N_{SYM}$ mod 10 = 9, otherwise set to 0. |
| B2-B3 | Coding | 2 | For SU, B2 is set to 0 for BCC, 1 for LDPC.<br>For MU, if the NSTS field for user 1 is non-zero, then B2 indicates the coding used for user 1; set to 0 for BCC and 1 for LDPC. If the NSTS field for user 1 is set to 0, then this field is reserved and set to 1.<br>B3: set to 1 if LDPC PPDU encoding process (or at least one LPDC user's PPDU encoding process) results in an extra OFDM symbol (or symbols). Set to 0 otherwise. |
| B4-B7 | MCS | 4 | For SU:<br>    MCS index<br>For MU:<br>    If the $N_{STS}$ field for user 2 is non-zero, then B4 indicates coding for user 2: set to 0 for BCC, 1 for LDPC. If $N_{STS}$ for user 2 is set to 0, then B4 is reserved and set to 1.<br>    If the $N_{STS}$ field for user 3 is non-zero, then B5 indicates coding for user 3: set to 0 for BCC, 1 for LDPC. If $N_{STS}$ for user 3 is set to 0, then B5 is reserved and set to 1.<br>    If the $N_{STS}$ field for user 4 is non-zero, then B6 indicates coding for user 4: set to 0 for BCC, 1 for LDPC. If $N_{STS}$ for user 4 is set to 0, then B4 is reserved and set to 1.<br>    B7 is reserved and set to 1 |
| B8 | Beamformed | 1 | For SU:<br>Set to 1 if a Beamforming steering matrix is applied to the waveform in an SU transmission as described in 20.3.11.10.1), set to 0 otherwise.<br>For MU:<br>Reserved and set to 1 |
| B9 | Reserved | 1 | Reserved and set to 1 |
| B10-B17 | CRC | 8 | CRC calculated as in Section 20.3.9.4.4 with C7 in B10, etc. |
| B18-B23 | Tail | 6 | Used to terminate the trellis of the convolutional decoder. Set to 0. |

PHYSICAL LAYER POWER SAVE FACILITY WITH RANDOM OFFSET

CROSS-REFERENCE TO RELATED APPLICATIONS

This application claims benefit of U.S. Provisional Patent Application Ser. No. 61/414,872, filed Nov. 17, 2010, which is herein incorporated by reference.

BACKGROUND

Field

Certain aspects of the present disclosure generally relate to wireless communications and, more particularly, to using a random offset to achieve power savings.

Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards, such as the Institute of Electrical and Electronics Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

A MIMO wireless system employs a number ($N_T$) of transmit antennas and a number ($N_R$) of receive antennas for data transmission. A MIMO channel formed by the $N_T$ transmit and $N_R$ receive antennas may be decomposed into a number ($N_S$) of spatial streams, where, for all practical purposes, $N_S \leq \min\{N_T, N_R\}$. Each of the $N_S$ spatial streams corresponds to a dimension. The MIMO system can provide improved performance (e.g., higher throughput and/or greater reliability) if the additional dimensionalities created by the multiple transmit and receive antennas are utilized.

In wireless networks with a single access point (AP) and multiple stations (STAs), concurrent transmissions may occur on multiple channels toward different stations, both in the uplink and downlink directions. Many challenges are present in such systems.

SUMMARY

Certain aspects of the present disclosure provide a first apparatus for wireless communications. The first apparatus generally includes a processing system and a transmitter. The processing system is typically configured to generate a message comprising a first value, wherein the first value is generated based on a second value associated with the apparatus and a third value associated with a second apparatus. The transmitter is generally configured to transmit the message to the second apparatus.

Certain aspects of the present disclosure provide a method for wireless communications. The method generally includes generating, at a first apparatus, a message comprising a first value, wherein the first value is generated based on a second value associated with the first apparatus and a third value associated with a second apparatus; and transmitting the message to the second apparatus.

Certain aspects of the present disclosure provide a first apparatus for wireless communications. The first apparatus generally includes means for generating a message comprising a first value, wherein the first value is generated based on a second value associated with the first apparatus and a third value associated with a second apparatus; and means for transmitting the message to the second apparatus.

Certain aspects of the present disclosure provide a computer-program product for wireless communications. The computer-program product generally includes a computer-readable medium having instructions executable for generating, at a first apparatus, a message comprising a first value, wherein the first value is generated based on a second value associated with the first apparatus and a third value associated with a second apparatus; and for transmitting the message to the second apparatus.

Certain aspects of the present disclosure provide an access point. The access point generally includes at least one antenna; a processing system configured to generate a message comprising a first value, wherein the first value is generated based on a second value associated with the access point and a third value associated with an apparatus; and a transmitter configured to transmit, via the at least one antenna, the message to the apparatus.

Certain aspects of the present disclosure provide a first apparatus for wireless communications. The first apparatus generally includes a receiver and a processing system. The receiver is typically configured to receive a message from a second apparatus, wherein the message comprises a first value. The processing system is generally configured to determine a second value generated based on a third value associated with the second apparatus and a fourth value associated with the first apparatus and to determine, based on the first value and the second value, whether the message is intended for the first apparatus.

Certain aspects of the present disclosure provide a method for wireless communications. The method generally includes receiving, at a first apparatus, a message from a second apparatus, wherein the message comprises a first value; determining a second value generated based on a third value associated with the second apparatus and a fourth value associated with the first apparatus; and determining, based on the first value and the second value, whether the message is intended for the first apparatus.

Certain aspects of the present disclosure provide a first apparatus for wireless communications. The first apparatus generally includes means for receiving a message from a second apparatus, wherein the message comprises a first value; means for determining a second value generated based on a third value associated with the second apparatus and a fourth value associated with the first apparatus; and means for determining, based on the first value and the second value, whether the message is intended for the first apparatus.

Certain aspects of the present disclosure provide a computer-program product for wireless communications. The computer-program product generally includes a computer-readable medium having instructions executable for receiving, at a first apparatus, a message from a second apparatus, wherein the message comprises a first value; for determining a second value generated based on a third value associated with the second apparatus and a fourth value associated with the first apparatus; and for determining, based on the first value and the second value, whether the message is intended for the first apparatus.

Certain aspects of the present disclosure provide a wireless node. The wireless node generally includes at least one antenna; a receiver configured to receive, via the at least one antenna, a message from an apparatus, wherein the message comprises a first value; and a processing system configured to determine a second value generated based on a third value associated with the apparatus and a fourth value associated with the wireless node and to determine, based on the first value and the second value, whether the message is intended for the wireless node.

Certain aspects of the present disclosure provide an apparatus for wireless communications. The apparatus generally includes a processing system and a transmitter. The processing system is typically configured to generate a message comprising a field, wherein the field comprises an indication of a number of space time streams if used in a multi-user transmission scheme or at least a portion of an identification (ID) value if used in a single-user transmission scheme. The transmitter is generally configured to transmit the message.

Certain aspects of the present disclosure provide a method for wireless communications. The method generally includes generating a message comprising a field, wherein the field comprises an indication of a number of space time streams if used in a multi-user transmission scheme or at least a portion of an ID value if used in a single-user transmission scheme, and transmitting the message.

Certain aspects of the present disclosure provide an apparatus for wireless communications. The apparatus generally includes means for generating a message comprising a field, wherein the field comprises an indication of a number of space time streams if used in a multi-user transmission scheme or at least a portion of an ID value if used in a single-user transmission scheme, and means for transmitting the message.

Certain aspects of the present disclosure provide a computer-program product for wireless communications. The computer-program product generally includes a computer-readable medium having instructions executable for generating a message comprising a field, wherein the field comprises an indication of a number of space time streams if used in a multi-user transmission scheme or at least a portion of an ID value if used in a single-user transmission scheme, and for transmitting the message.

Certain aspects of the present disclosure provide a wireless node. The wireless node generally includes at least one antenna; a processing system configured to generate a message comprising a field, wherein the field comprises an indication of a number of space time streams if used in a multi-user transmission scheme or at least a portion of an ID value if used in a single-user transmission scheme; and a transmitter configured to transmit the message, via the at least one antenna.

Certain aspects of the present disclosure provide an apparatus for wireless communications. The apparatus generally includes a receiver configured to receive a message comprising a field, wherein the field comprises an indication of a number of space time streams if used in a multi-user transmission scheme or at least a portion of an ID value if used in a single-user transmission scheme; and a processing system configured to determine, based on the at least the portion of the ID value, whether the message is intended for the apparatus.

Certain aspects of the present disclosure provide a method for wireless communications. The method generally includes receiving, at an apparatus, a message comprising a field, wherein the field comprises an indication of a number of space time streams if used in a multi-user transmission scheme or at least a portion of an ID value if used in a single-user transmission scheme; and determining, based on the at least the portion of the ID value, whether the message is intended for the apparatus.

Certain aspects of the present disclosure provide an apparatus for wireless communications. The apparatus generally includes means for receiving a message comprising a field, wherein the field comprises an indication of a number of space time streams if used in a multi-user transmission scheme or at least a portion of an ID value if used in a single-user transmission scheme; and means for determining, based on the at least the portion of the ID value, whether the message is intended for the apparatus.

Certain aspects of the present disclosure provide a computer-program product for wireless communications. The computer-program product generally includes a computer-readable medium having instructions executable for receiving, at an apparatus, a message comprising a field, wherein the field comprises an indication of a number of space time streams if used in a multi-user transmission scheme or at least a portion of an ID value if used in a single-user transmission scheme; and for determining, based on the at least the portion of the ID value, whether the message is intended for the apparatus.

Certain aspects of the present disclosure provide a wireless node. The wireless node generally includes at least one antenna; a receiver configured to receive, via the at least one antenna, a message comprising a field, wherein the field comprises an indication of a number of space time streams if used in a multi-user transmission scheme or at least a portion of an ID value if used in a single-user transmission scheme; and a processing system configured to determine, based on the at least the portion of the ID value, whether the message is intended for the wireless node.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7A is an example bit composition table of a Very High Throughput (VHT) Signal A1 (VHT-SIG-A1) field, in accordance with certain aspects of the present disclosure.

FIG. 7B is an example bit composition table of a VHT Signal A2 (VHT-SIG-A2) field, in accordance with certain aspects of the present disclosure.

DETAILED DESCRIPTION

Figure 1:
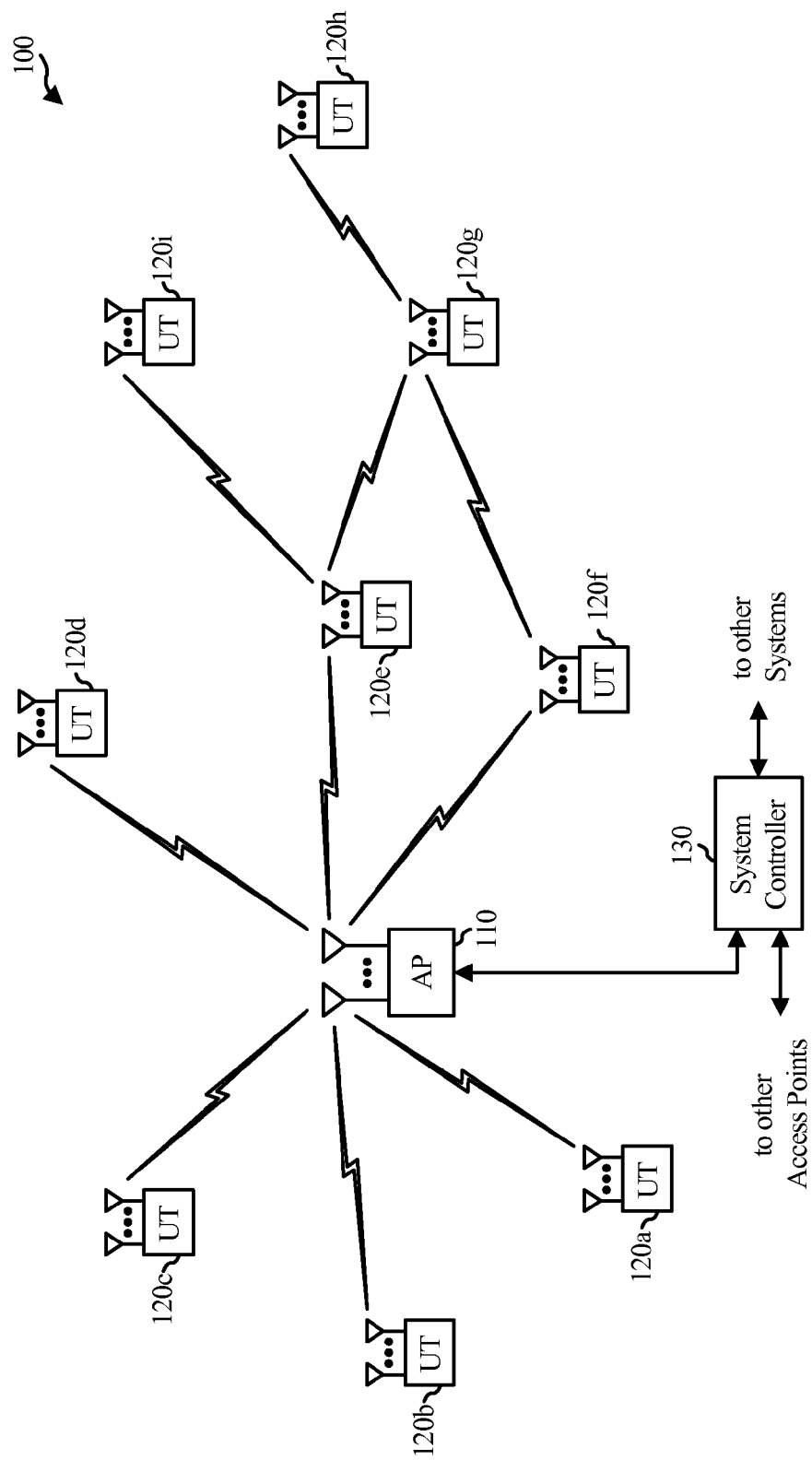
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support the Institute of Electrical and Electronics Engineers (IEEE) 802.11n or earlier amendments to the IEEE 802.11 standard.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

AN EXAMPLE WIRELESS COMMUNICATION SYSTEM

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to a different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such a wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency, or time by some means. $N_u$ may be greater than $N_{ap}$ if the data symbol streams can be multiplexed using TDMA techniques, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
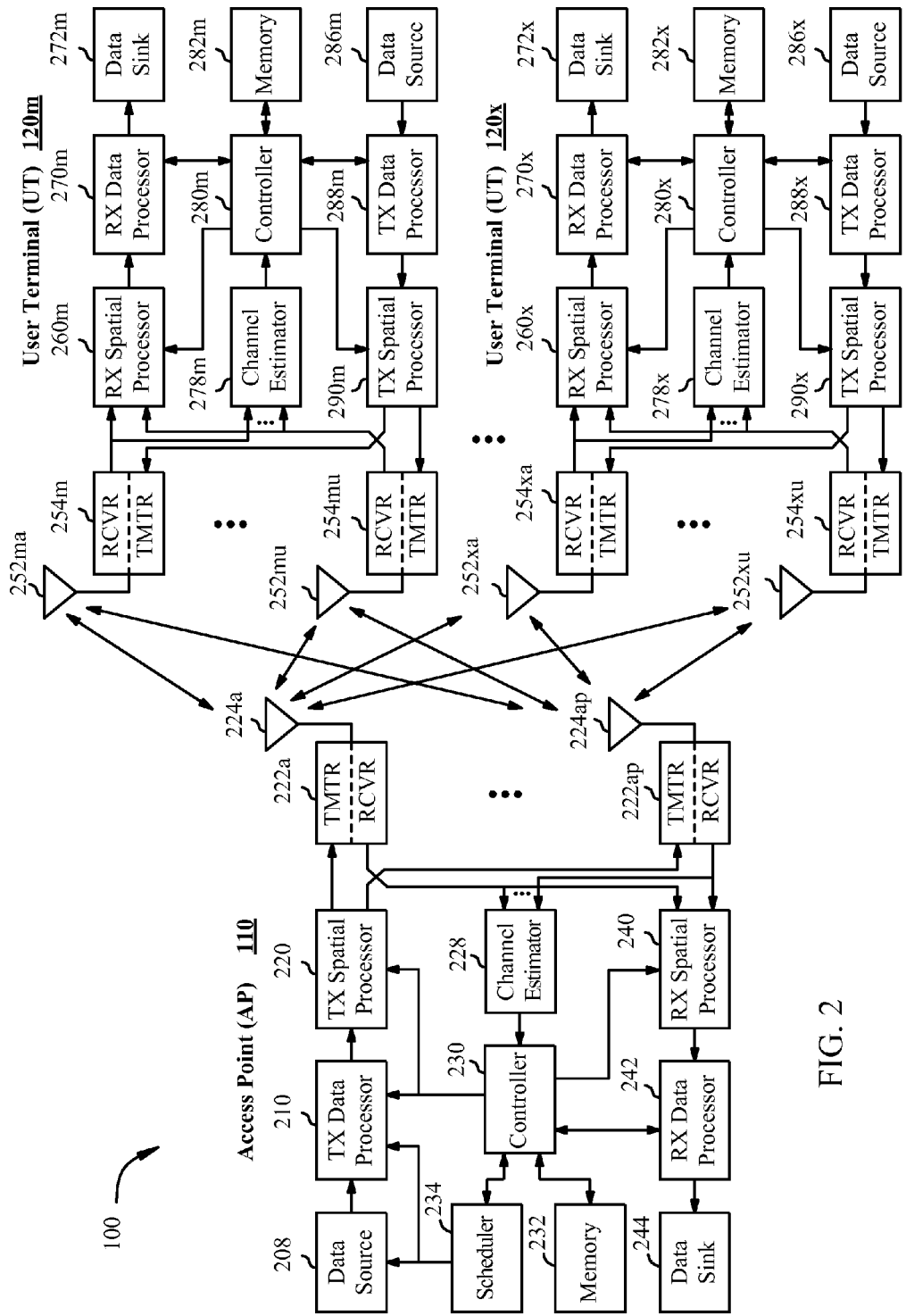
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. Beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number ($N_{up}$) of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{up,m}\}$ is an estimate of a data symbol stream $\{s_{up}\}$ transmitted by a respective user terminal. An RX data processor 242 processes (e.g., demodulates, deinterleaves, and decodes) each recovered uplink data symbol stream $\{s_{up}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
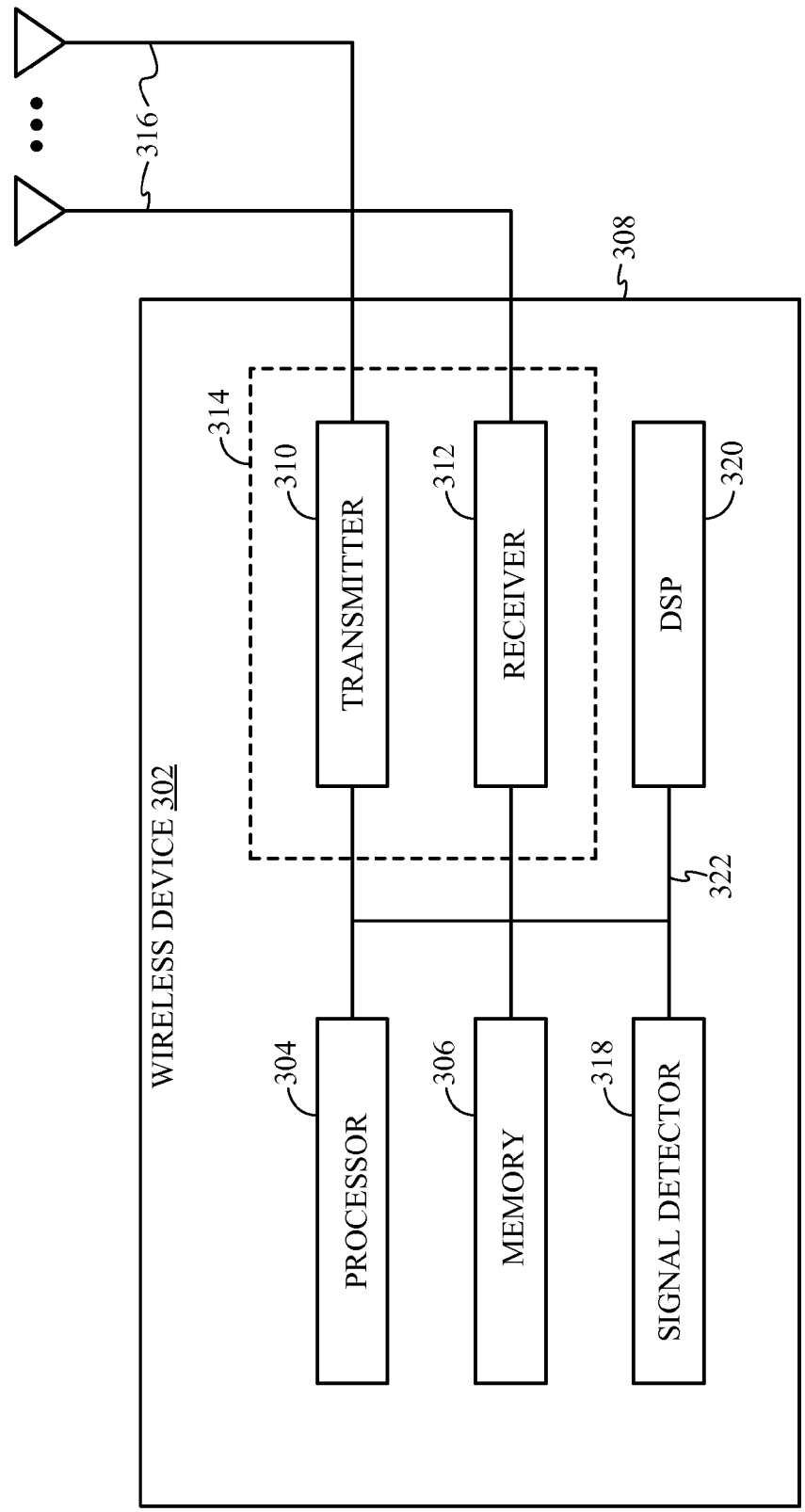
FIG. 3 illustrates a block diagram of an example wireless device in accordance with certain aspects of the present disclosure.

FIG. 3 illustrates various components that may be utilized in a wireless device 302 that may be employed within a wireless communication system, such as the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density, and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

The system 100 illustrated in FIG. 1 may operate in accordance with the IEEE 802.11ac wireless communications standard. The IEEE 802.11ac represents an IEEE 802.11 amendment that allows for higher throughput in IEEE 802.11 wireless networks. The higher throughput may be realized through several measures, such as parallel transmissions to multiple stations (STAs) at once, or by using a wider channel bandwidth (e.g., 80 MHz or 160 MHz). The IEEE 802.11ac standard is also referred to as the Very High Throughput (VHT) wireless communications standard.

PHYSICAL LAYER POWER SAVE FACILITY

Certain aspects of the present disclosure propose a method to transmit information in unused fields of a physical layer header to improve performance of the system. The proposed method transmits, during single user transmission, a portion of the basic service set identifier (BSSID) of an access point in a field of a header that is usually used to indicate number of space time streams (Nsts).

The IEEE 802.11ac standard, which is also referred to as Very High Throughput (VHT), supports high throughput operation of the network which is realized through several measures such as parallel transmissions to multiple stations (STAs) at once, or by using a wide channel bandwidth, such as 80 MHz or 160 MHz.

The 802.11ac physical (PHY) header format may contain a field named "Number of Space Time Streams (Nsts)" field. The Nsts field may be required for multi-user (MU) transmissions, but it may partly be unused for single-user (SU) transmissions. For example, bits 13-21 (9 bits) of the Nsts field may be unused. These 9 bits of the Nsts field may be used to signal a partial association identifier (AID), so that stations (STAs) with a different partial AID may stop receiving a packet after having received a partial AID that is different from their own.

The access point does not assign an AID to itself, and thus, it is undefined what value of the 9-bit field a STA (e.g., an access terminal) should use for transmissions to the AP. Such transmissions to an AP are referred to as uplink transmissions.

For certain aspects, the unused Nsts field may be filled with a partial basic service set identifier (BSSID) for uplink single user (SU) packets, and with a partial AID for unicast downlink SU packets. The BSSID is the media access control (MAC) address of the AP, which implies that the 9-bit field of uplink SU transmissions contains the first 9 bits of the medium access control (MAC) address of the AP. Note that the 9 bits are exemplary only.

Figure 4A:
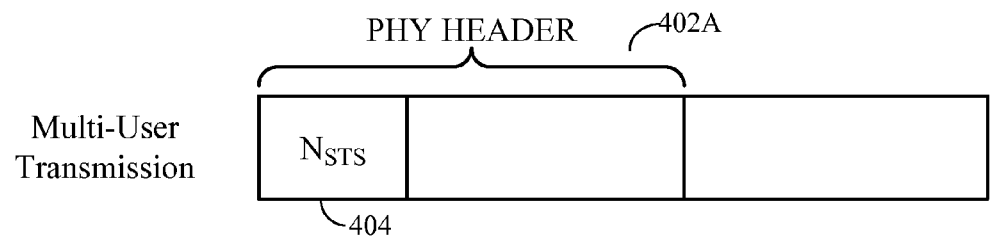
FIGS. 4A-4C illustrate example packets that may be transmitted in single user (SU) or multi-user (MU) transmission schemes, in accordance with certain aspects of the present disclosure.
Figure 4B:
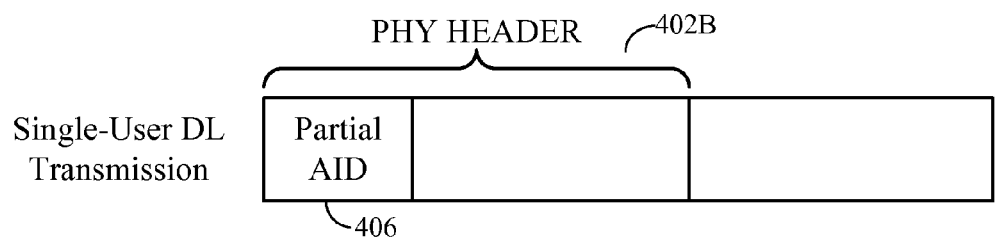
Figure 4C:
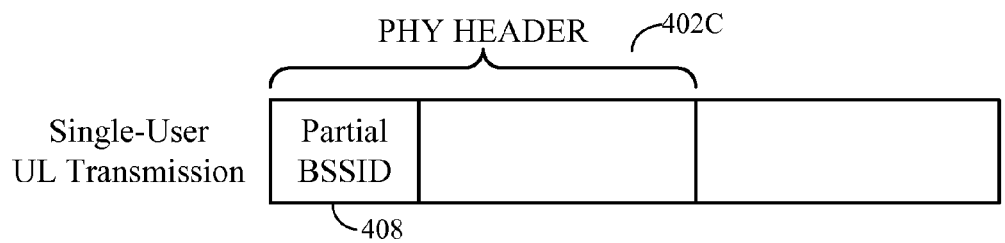

FIGS. 4A-4C illustrate example packets that may be transmitted in single user or multi-user transmission schemes, in accordance with certain aspects of the present disclosure.

FIG. 4A illustrates an example message format (e.g., a packet) which includes a PHY header 402A and a field 404 that may be used to transmit an indication of the number of space time streams ($N_{sts}$) when used for multi-user transmission.

FIG. 4B illustrates a message transmitted using single-user downlink transmission. The message may include a PHY header 402B and a field 406 with a portion of the AID of a station for which the packet is targeted.

FIG. 4C illustrates a message transmitted using single user uplink transmission. The message may include a PHY header 402C with a field 408 with a portion of the BSSID of the access point for which the message is targeted.

For certain aspects, while assigning AIDs to STAs, the AP may skip AIDs with a partial AID equal to its partial BSSID (e.g., equal to the 9 least significant bits (LSBs) of its MAC address).

For certain aspects, while assigning AIDs to STAs, the AP may also skip partial BSSIDs of other APs in its neighborhood. These BSSIDs may be obtained through received beacons from surrounding APs.

Using a partial AID for unicast downlink SU packets may ensure that there will be no collisions within a basic service set (BSS). In other words, each STA may have a unique value inside PHY header directed at it, allowing all other STAs in the BSS to go back to sleep for the remaining duration of the packet (up to 510 devices, which is equal to 512 values for a 9-bit field, less the broadcast partial AID (all 0s) and the partial BSSID of the AP).

For certain aspects, uplink transmissions may not collide within the BSS, but they may collide with the partial AID of STAs in other BSSs. However, the probability that this occurs is low. For certain aspects, a STA may request a different AID if it detects a collision with another AP or with a STA in another BSS.

Figure 5:
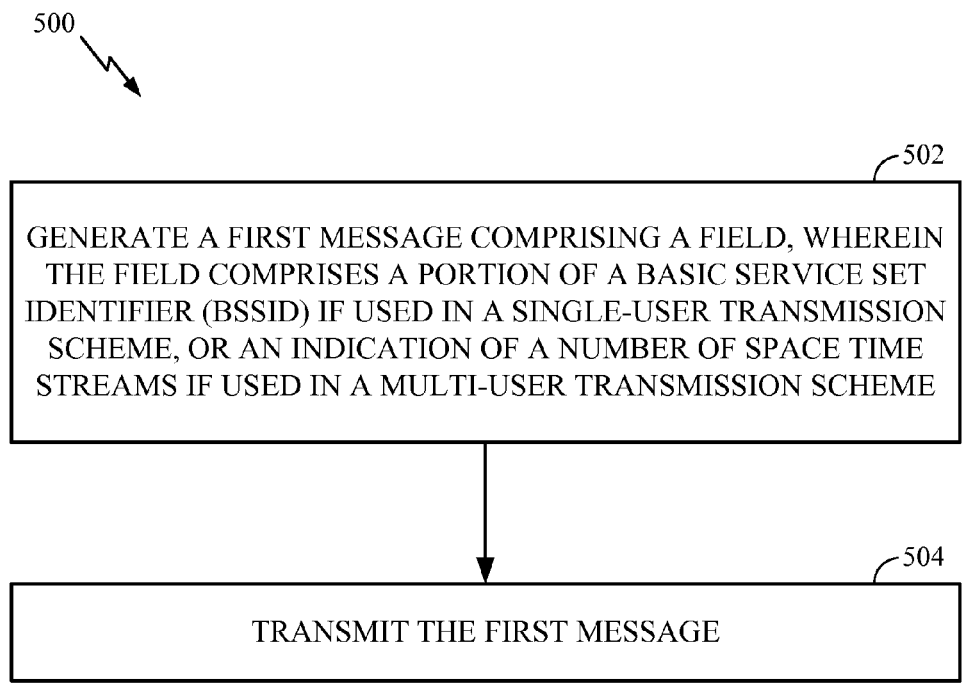
FIG. 5 illustrates example operations for facilitating power savings that may be performed by a station, in accordance with certain aspects of the present disclosure.
Figure 5A:
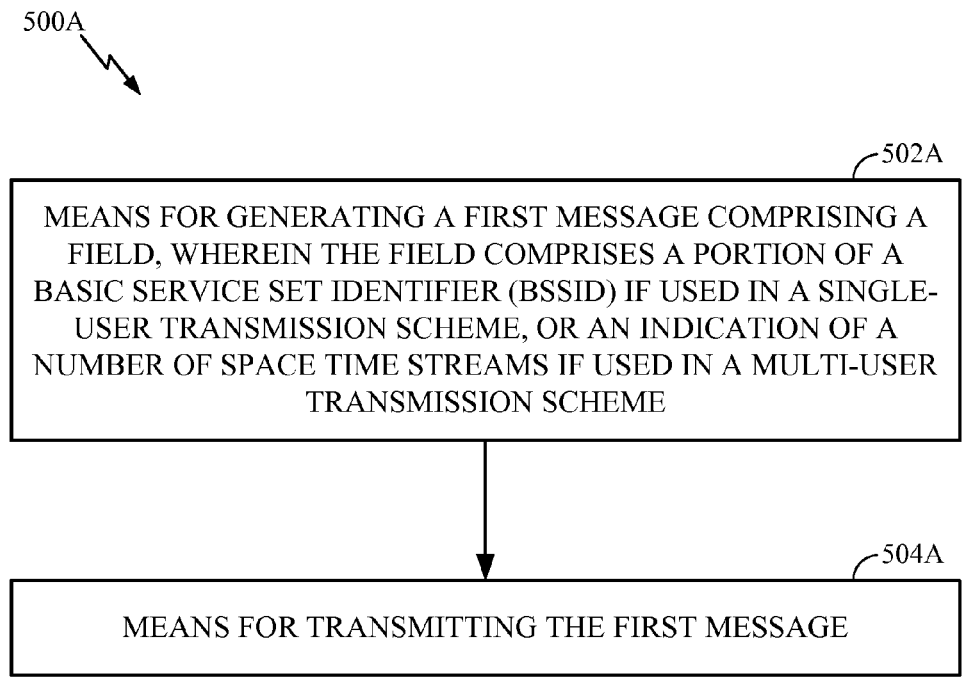
FIG. 5A illustrates example means capable of performing the operations shown in FIG. 5.

FIG. 5 illustrates example operations 500 for facilitating power savings that may be performed by a station, in accordance with certain aspects of the present disclosure. The operations may begin, at 502, with the station generating a first message comprising a field, wherein the field comprises a portion of a basic service set identifier (BSSID) if used in a single-user transmission scheme, or an indication of a number of space time streams if used in a multi-user transmission scheme. At 504, the station transmits the first message to an access point. The station may also receive a second message comprising a field, wherein the field comprises a portion of an association identifier (AID) if the second message is transmitted utilizing a single-user transmission scheme, or an indication of number of space time streams if the second message is transmitted utilizing a multi-user transmission scheme.

For certain aspects, the station may compare the received AID with its AID and discard the second message if the received AID is different from its AID.

Figure 6:
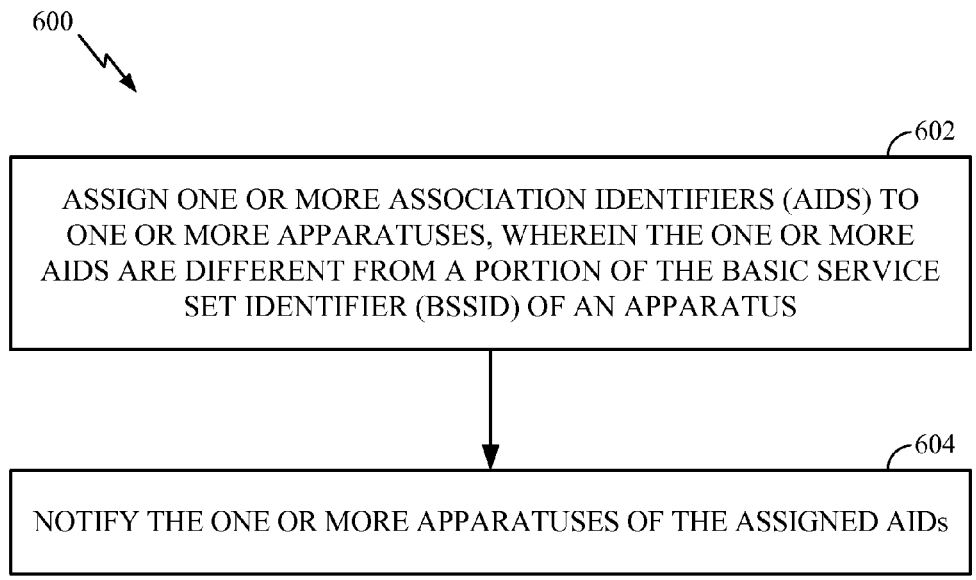
FIG. 6 illustrates example operations for facilitating power savings that may be performed by an access point, in accordance with certain aspects of the present disclosure.
Figure 6A:
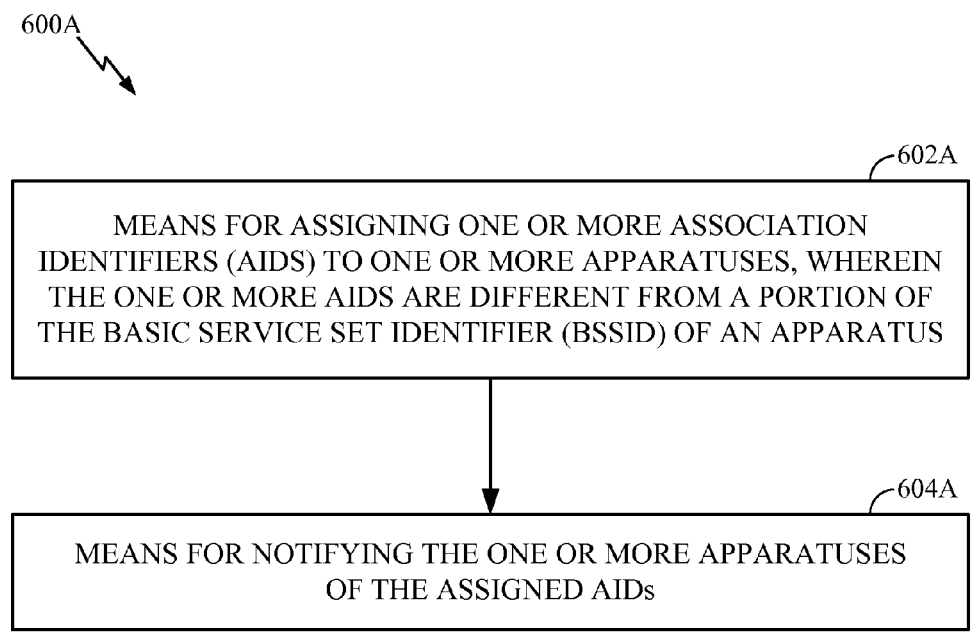
FIG. 6A illustrates example means capable of performing the operations show in FIG. 6.

FIG. 6 illustrates example operations 600 for facilitating power savings that may be performed by an access point, in accordance with certain aspects of the present disclosure. The operations 600 may begin, at 602, with the access point assigning one or more AIDs to one or more apparatuses, wherein the one or more AIDs are different from a portion of the basic service set identifier (BSSID) of an apparatus. At 604, the access point may notify the one or more apparatuses of the assigned AIDs.

PHYSICAL LAYER POWER SAVE FACILITY WITH RANDOM OFFSET

As described above, the 802.11ac physical (PHY) header may contain a "Number of Space Time Streams (Nsts)" field as part of the VHT Signal A (VHT-SIG-A) field. The VHT-SIG-A field carries information to interpret VHT format packets. The Nsts field may be utilized for multi-user (MU) transmissions, but it may partly be unused for single-user (SU) transmissions. For example, bits 13-21 (9 bits) of the Nsts field may be unused. These 9 bits of the Nsts field may be used to signal a partial association identifier (AID), so that stations (STAs) with a different partial AID may stop receiving a packet after having received a partial AID that is different from their own.

For certain aspects, the AID may be selected randomly by the AP to reduce the probability of partial AID collisions between overlapping BSSs. The random selection may cause an unwanted increase in the Traffic Indication Map (TIM) present in every beacon.

FIGS. 7A and 7B are example bit composition tables 700, 750 of a VHT-SIG-A1 field and a VHT-SIG-A2 field, respectively, in accordance with certain aspects of the present disclosure. For certain aspects of the present disclosure, the AID selection may be kept sequential and may start at 1. A BSS-specific offset may be added to the (partial) AID prior to entering the partial AID into the 9-bit field of the PHY header (e.g., bits 13-21 of the $N_{STS}$ field in table 700). The BSS-specific offset may be selected randomly by the AP and signaled to the associated STAs through the association response, or it may be communicated to the STA via other means.

In this manner, the value in the 9-bit field for downlink transmissions may, with high likelihood, be different from one BSS to the next, allowing STAs to remain awake only when a frame is being transmitted to them.

Figure 8:
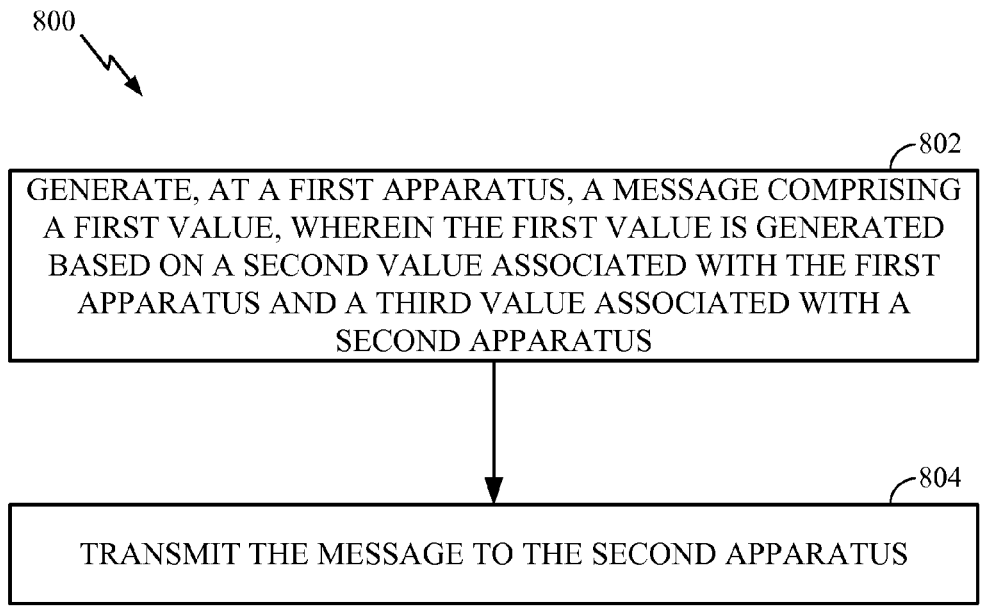
FIG. 8 illustrates example operations, from the perspective of an access point, for transmitting a message based on a value associated with the access point and another value associated with a station, in accordance with certain aspects of the present disclosure.

FIG. 8 illustrates example operations 800, from the perspective of a first apparatus (e.g., an access point), for transmitting a message based on a value associated with the first apparatus and another value associated with a second apparatus (e.g., a station), in accordance with certain aspects of the present disclosure. The operations 800 may begin, at 802, with the first apparatus generating a message comprising a first value. The first value may be generated based on a second value associated with the first apparatus and a third value associated with a second apparatus. At 804, the first apparatus may transmit the message to the second apparatus.

According to certain aspects, the second value may be selected randomly. For certain aspects, the generation may comprise combining the second value associated with the first apparatus and the third value associated with the second apparatus. The combining may comprise adding the second value to the third value. For certain aspects, the combining may further comprise truncating a result of the addition.

For certain aspects, the operations 800 may further comprise the first apparatus sequentially assigning a plurality of values to a plurality of apparatuses. The third value may be one of the plurality of values.

For certain aspects, the first apparatus may provide the second value to the second apparatus (e.g., via an association response). For certain aspects, the first apparatus may provide the third value to the second apparatus. Providing a value to a particular apparatus may include transmitting or signaling the value to that particular apparatus.

Figure 9:
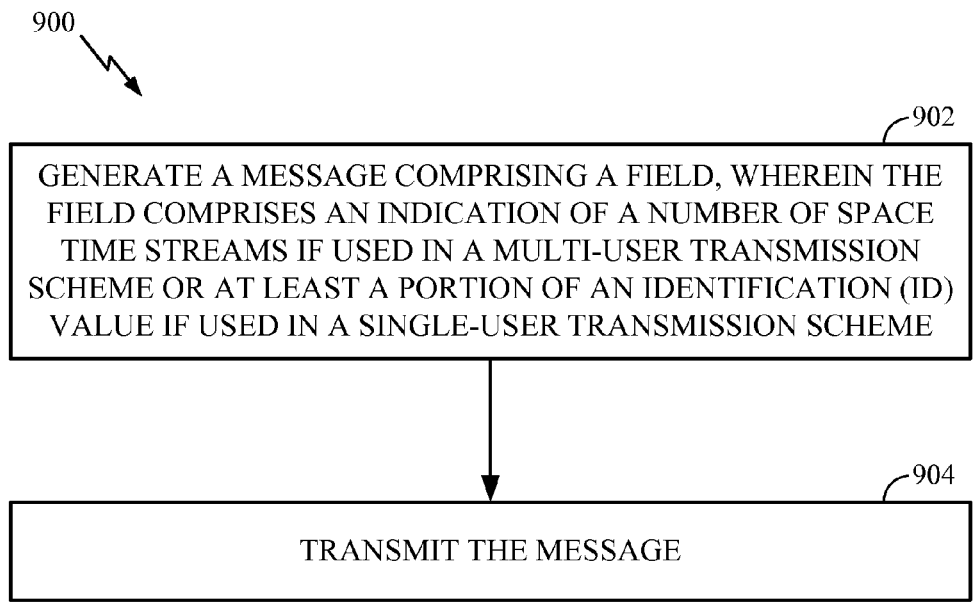
FIG. 9 illustrates example operations, from the perspective of an access point, for transmitting a message comprising an indication of a number of space time streams or an identification value, in accordance with certain aspects of the present disclosure.
Figure 9A:
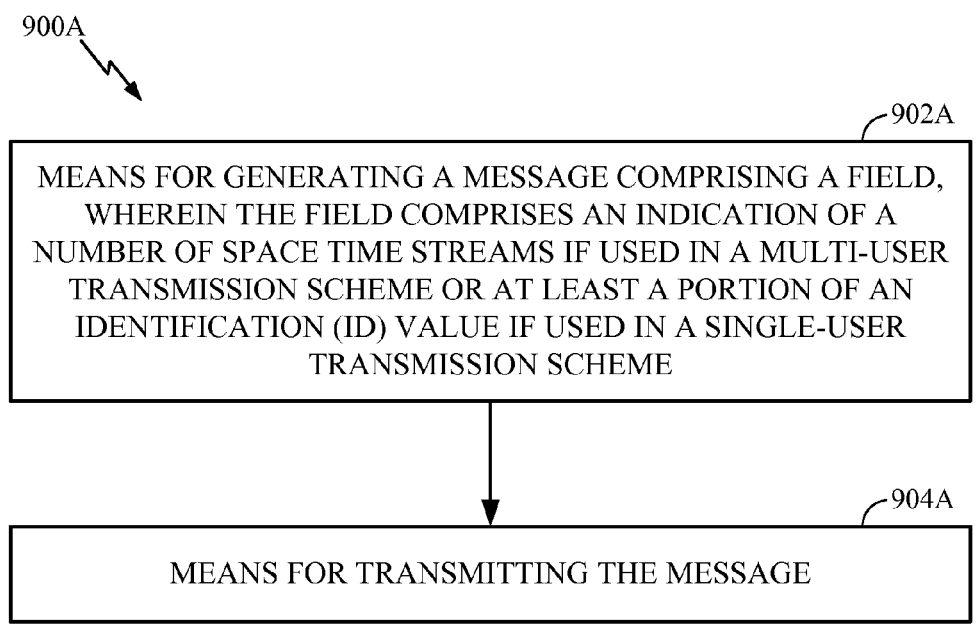
FIG. 9A illustrates example means capable of performing the operations shown in FIG. 9.

FIG. 9 illustrates example operations 900, from the perspective of an apparatus (e.g., an access point), for transmitting a message comprising an indication of a number of space time streams or an identification value, in accordance with certain aspects of the present disclosure. The operations 900 may begin, at 902, with the apparatus generating a message comprising a field. The field may comprise an indication of a number of space time streams if used in a multi-user transmission scheme or at least a portion of an identification (ID) value if used in a single-user transmission scheme. At 904, the apparatus may transmit the message.

Figure 10:
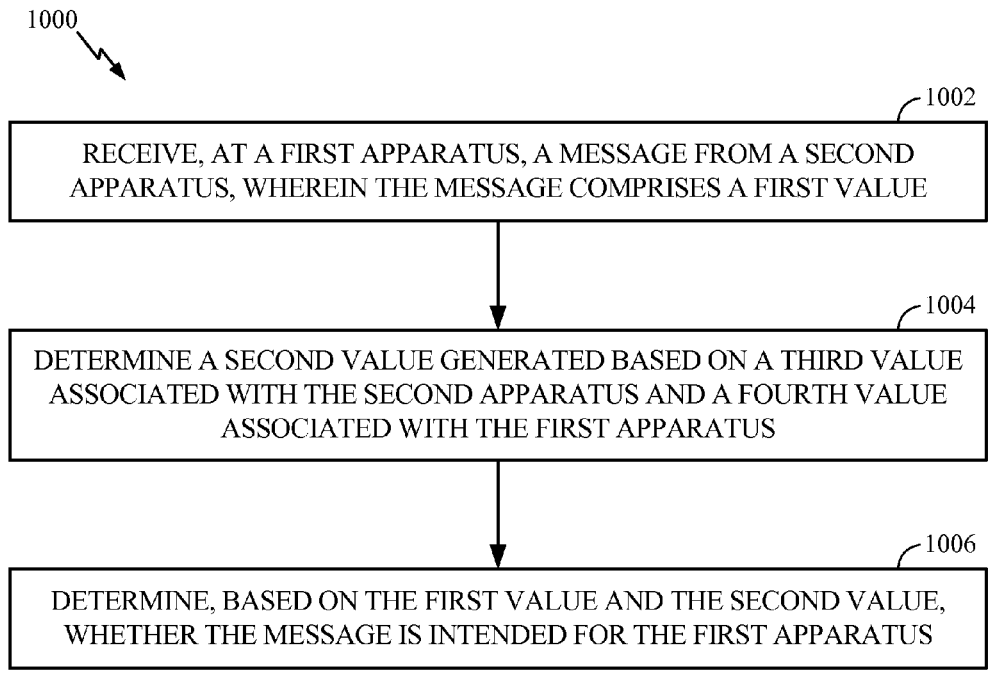
FIG. 10 illustrates example operations, from the perspective of a station, for determining whether a received message is intended for the station based on a value associated with an access point and another value associated with the station, in accordance with certain aspects of the present disclosure.
Figure 10A:
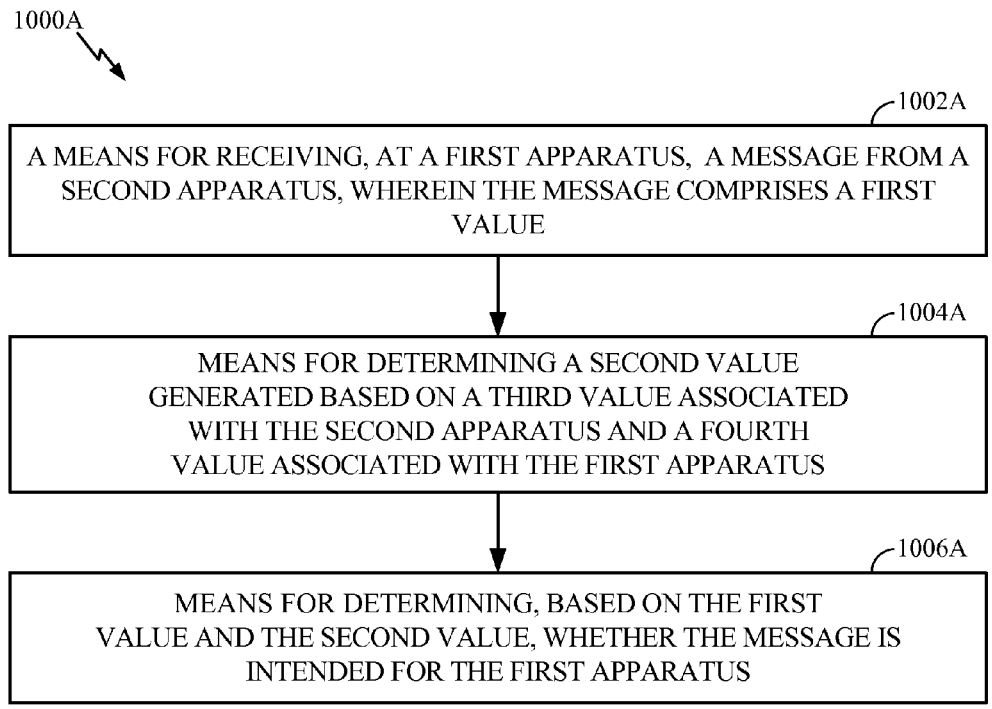
FIG. 10A illustrates example means capable of performing the operations shown in FIG. 10

FIG. 10 illustrates example operations 1000, from the perspective of a first apparatus (e.g., a station), for determining whether a received message is intended for the first apparatus based on a value associated with the first apparatus and another value associated with a second apparatus (e.g., an access point), in accordance with certain aspects of the present disclosure. The operations 1000 may begin, at 1002, with the first apparatus receiving a message from a second apparatus. The message may comprise a field, wherein the field comprises a first value. At 1004, the first apparatus may determine a second value generated by combining a third value associated with the second apparatus and a fourth value associated with the first apparatus.

At 1006, the first apparatus may determine, based on the first value and the second value, whether the message is intended for the first apparatus. The message may be determined to be intended for the first apparatus if the first value equals the second value. Otherwise, the first apparatus may determine that the message is not intended for the first apparatus if the first value does not equal the second value. In this case, the first apparatus may terminate processing (e.g., interpretation) of the message based on the determination.

For certain aspects, the first apparatus may determine, in a first mode, whether the message is intended for the first apparatus. Then, the first apparatus may initiate a second mode in response to determining that the first apparatus is not the intended recipient of the message, wherein the second mode has lower power consumption than the first mode. For example, the first mode may be an awake mode, while the second mode is a sleep mode.

According to certain aspects, the operations 1000 may further comprise the first apparatus receiving an indication of the fourth value associated with the first apparatus. The fourth value associated with the first apparatus may be one of a plurality of values assigned sequentially to a plurality of apparatuses. For certain aspects, at least a portion of the second value may include a plurality of least significant bits (LSBs) of the fourth value associated with the first apparatus.

For certain aspects, the operations 1000 may further comprise the first apparatus receiving an indication of the third value associated with the second apparatus. The first apparatus may receive this indication via an association response.

Figure 11:
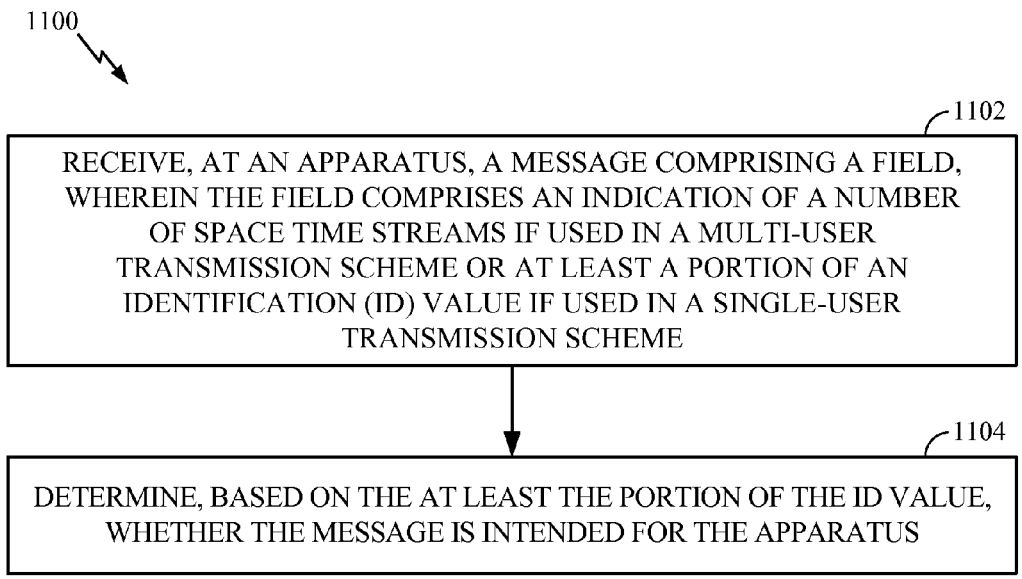
FIG. 11 illustrates example operations, from the perspective of a station, for determining whether a received message is intended for the station based on at least a portion of an identification value in the received message, in accordance with certain aspects of the present disclosure.
Figure 11A:
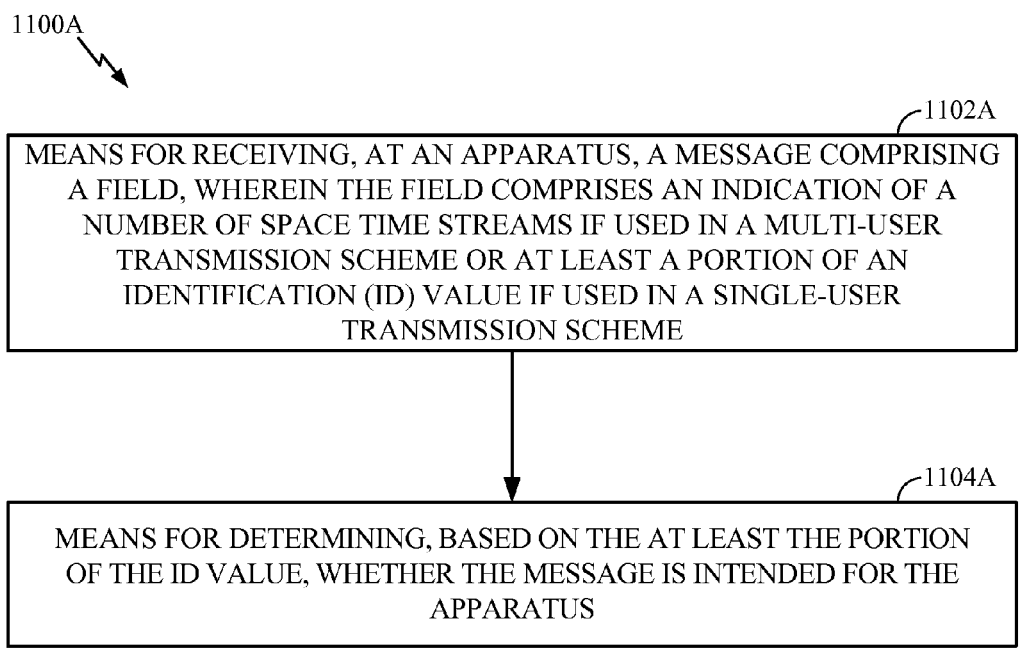
FIG. 11A illustrates example means capable of performing the operations shown in FIG. 11.

FIG. 11 illustrates example operations 1100, from the perspective of an apparatus (e.g., a station), for determining whether a received message is intended for the station based on at least a portion of an identification value in the received message, in accordance with certain aspects of the present disclosure. The operations may begin, at 1102, with the apparatus receiving a message comprising a field. The field may comprise an indication of a number of space time streams if used in a multi-user transmission scheme or at least a portion of an identification (ID) value if used in a single-user transmission scheme. At 1104, the apparatus may determine, based on the at least the portion of the ID value, whether the message is intended for the apparatus.

Figure 8A:
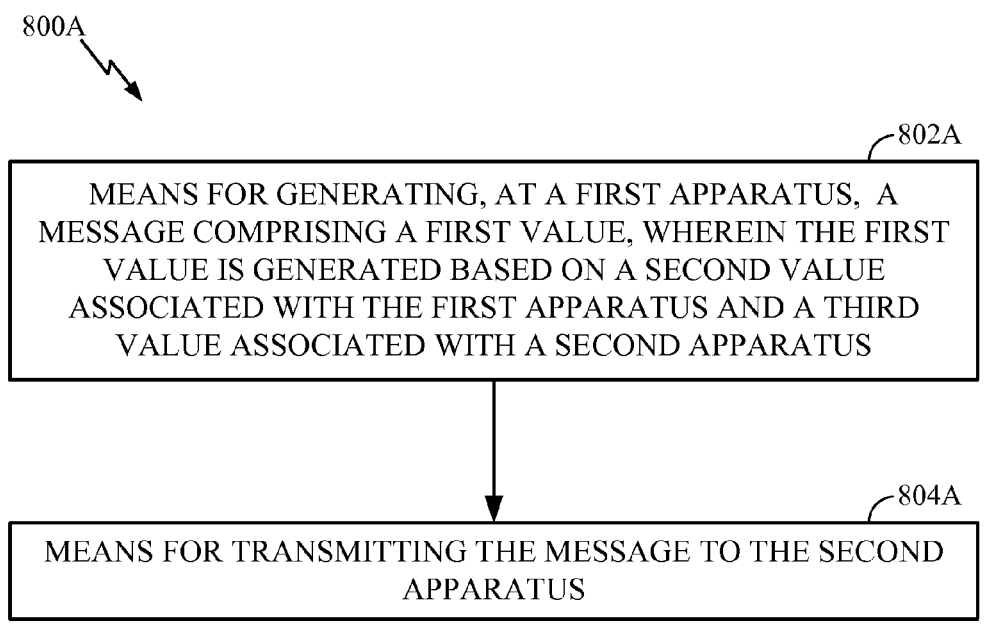
FIG. 8A illustrates example means capable of performing the operations shown in FIG. 8.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, operations 800 illustrated in FIG. 8 correspond to means 800A illustrated in FIG. 8A.

For example, means for transmitting, means for signaling, or means for providing may comprise a transmitter, such as the transmitter unit 222 of the access point 110 illustrated in FIG. 2, the transmitter unit 254 of the user terminal 120 depicted in FIG. 2, or the transmitter 310 of the wireless device 302 shown in FIG. 3. Means for receiving may comprise a receiver, such as the receiver unit 222 of the access point 110 illustrated in FIG. 2, the receiver unit 254 of the user terminal 120 depicted in FIG. 2, or the receiver 312 of the wireless device 302 shown in FIG. 3. Means for generating a message, means for combining, means for sequentially assigning, means for terminating processing, means for initiating, means for adding, means for truncating, means for determining, and/or means for processing may comprise a processing system, which may include one or more processors, such as the TX data processor 210 and/or the controller 230 of the access point 110 or the TX data processor 288 and/or the controller 280 of the user terminal 120 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, a phrase referring to "at least one of a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A first apparatus for wireless communications, comprising:
a processing system configured to generate a message comprising a first identification value, wherein the first identification value is generated based on a value associated with the first apparatus and a second identification value associated with a second apparatus, and wherein generating the first identification value comprises adding the value associated with the first apparatus to the second identification value associated with the second apparatus; and
a transmitter configured to transmit the message to the second apparatus.

2. The first apparatus of claim 1, wherein generating the first identification value further comprises truncating a result of the addition.

3. The first apparatus of claim 1, wherein the value associated with the first apparatus is selected randomly.

4. The first apparatus of claim 1, wherein the transmitter is further configured to provide the second identification value to the second apparatus, wherein the second identification value comprises an association identifier (AID).

5. The apparatus of claim 1, wherein the first identification value comprises least significant bits of the resulting sum of the addition of the value associated with the first apparatus and the second identification value associated with the second apparatus.

6. The apparatus of claim 5, wherein the LSBs comprise 9 bits.

7. The apparatus of claim 1, wherein:
the value associated with the first apparatus comprises a basic service set (BSS)-specific offset; and
the second identification value comprises at least a portion of an association identifier (AID).

8. The apparatus of claim 1, wherein the transmitter is configured to transmit the value associated with the first apparatus to the second apparatus prior to transmitting the message to the second apparatus.

9. The apparatus of claim 1, wherein the generation of the message comprises:
generating the message comprising the first identification value if used in a single-user transmission scheme, and
generating a message comprising an indication of a number of space time streams if used in a multi-user transmission scheme.

10. A first apparatus for wireless communications, comprising:
a processing system configured to sequentially assign a plurality of identification values to a plurality of apparatuses and generate a message comprising a first identification value, wherein the first identification value is generated based on a value associated with the first apparatus and a second identification value associated with a second apparatus, wherein the second apparatus is one of the plurality of apparatuses, and wherein the second identification value is one of the plurality of identification values assigned to the second apparatus; and
a transmitter configured to transmit the message to the second apparatus.

11. The apparatus of claim 10, wherein the first identification value comprises least significant bits of the resulting sum of the addition of the value associated with the first apparatus and the second identification value associated with the second apparatus.

12. The apparatus of claim 10, wherein the sequential assignment comprises:
skipping a value if the value is equal to a third identification value of the first apparatus or if the value is equal to a fourth identification value of a neighbor access point (AP).

13. The first apparatus of claim 10, wherein generating the first identification value further comprises truncating a result of the addition.

14. A first apparatus for wireless communications, comprising:
a processing system configured to generate a message comprising a first identification value, wherein the first identification value is generated based on a value associated with the first apparatus and a second identification value associated with a second apparatus; and a transmitter configured to provide the value associated with the first apparatus to the second apparatus via an association response and to transmit the message to the second apparatus.

15. The apparatus of claim 14, wherein the first identification value comprises least significant bits of the resulting sum of the addition of the value associated with the first apparatus and the second identification value associated with the second apparatus.

16. The first apparatus of claim 14, wherein generating the first identification value further comprises truncating a result of the addition.

17. A method for wireless communications, comprising:
generating, at a first apparatus, a message comprising a first identification value, wherein the first identification value is generated based on a value associated with the first apparatus and a second identification value associated with a second apparatus, and wherein generating the first identification value comprises adding the value associated with the first apparatus to the second identification value associated with the second apparatus; and
transmitting the message to the second apparatus.

18. The method of claim 17, wherein the generating the first identification value further comprises truncating a result of the addition.

19. The method of claim 17, wherein the value associated with the first apparatus is selected randomly.

20. The method of claim 17, wherein further comprising providing the second identification value to the second apparatus, wherein the second identification value comprises an association identifier (AID).

21. A method for wireless communications, comprising:
sequentially assigning a plurality of identification values to a plurality of apparatuses;
generating, at a first apparatus, a message comprising a first identification value, wherein the first identification value is generated based on a value associated with the first apparatus and a second identification value associated with a second apparatus, wherein the second apparatus is one of the plurality of apparatuses, and wherein the second identification value is one of the plurality of identification values assigned to the second apparatus; and
transmitting the message to the second apparatus.

22. A method for wireless communications, comprising:
generating, at a first apparatus, a message comprising a first identification value, wherein the first identification value is generated based on a value associated with the first apparatus and a second identification value associated with a second apparatus;
providing the value associated with the first apparatus to the second apparatus via an association response; and
transmitting the message to the second apparatus.

23. A first apparatus for wireless communications, comprising:
means for generating a message comprising a first value, wherein the first identification value is generated based on a value associated with the first apparatus and a second identification value associated with a second apparatus, and wherein generating the first identification value comprises adding the value associated with the first apparatus to the second identification value associated with the second apparatus; and means for transmitting the message to the second apparatus.

24. The first apparatus of claim 23, wherein generating the first identification value further comprises truncating a result of the addition.

25. The first apparatus of claim 23, wherein the value associated with the first apparatus is selected randomly.

26. The first apparatus of claim 23, further comprising means for providing the second identification value to the second apparatus, wherein the second identification value comprises an association identifier (AID).

27. A first apparatus for wireless communications, comprising:
means for sequentially assigning a plurality of identification values to a plurality of apparatuses;
means for generating a message comprising a first identification value, wherein the first identification value is generated based on a value associated with the first apparatus and a second identification value associated with a second apparatus, wherein the second apparatus is one of the plurality of apparatuses, and wherein the second identification value is one of the plurality of identification values assigned to the second apparatus; and
means for transmitting the message to the second apparatus.

28. A first apparatus for wireless communications, comprising:
means for generating a message comprising a first identification value, wherein the first identification value is generated based on a value associated with the first apparatus and a second identification value associated with a second apparatus;
means for providing the value associated with the first apparatus to the second apparatus via an association response; and
means for transmitting the message to the second apparatus.

29. A non-transitory computer-readable medium storing computer executable code, comprising:
code for generating, at a first apparatus, a message comprising a first value, wherein the first identification value is generated based on a value associated with the first apparatus and a second identification value associated with a second apparatus, and wherein generating the first identification value comprises adding the value associated with the first apparatus to the second identification value associated with the second apparatus; and
code for transmitting the message to the second apparatus.

30. An access point, comprising:
at least one antenna;
a processing system configured to generate a message comprising a first identification value, wherein the first identification value is generated based on a value associated with the access point and a second identification value associated with an apparatus, and wherein generating the first identification value comprises adding the value associated with the access point to the second identification value associated with the apparatus; and
a transmitter configured to transmit, via the at least one antenna, the message to the apparatus.

31. A first apparatus for wireless communications, comprising:

a receiver configured to receive a message from a second apparatus, wherein the message comprises a first identification value; and a processing system configured to:
determine a second identification value generated based on a value associated with the second apparatus and a third identification value associated with the first apparatus, wherein the second identification value is generated by adding the value associated with the second apparatus to the third identification value associated with the first apparatus;

determine, based on the first identification value and the second identification value, whether the message is intended for the first apparatus; and process the message based on the determination.

32. The first apparatus of claim 31, wherein the processing system is configured to determine that the message is intended for the first apparatus if the first identification value equals the second identification value.

33. The first apparatus of claim 31, wherein:
the determination of whether the message is intended for the first apparatus comprises determining the message is not intended for the first apparatus if the first identification value does not equal the second identification value, and
processing the message based on the determination comprises terminating processing of the message based on the determination that the message is not intended for the first apparatus.

34. The first apparatus of claim 31, wherein the determination of whether the message is intended for the first apparatus occurs in a first mode and the processing system is further configured to:
initiate a second mode if the message is not intended for the first apparatus, wherein power consumption of the first apparatus when operating in the second mode is lower than power consumption of the first apparatus when operating in the first mode.

35. The first apparatus of claim 31, wherein the receiver is further configured to receive an indication of the third identification value associated with the first apparatus, wherein the third identification value comprises an association identifier (AID).

36. The first apparatus of claim 31, wherein at least a portion of the second identification value comprises a plurality of least significant bits (LSBs) of the third identification value associated with the first apparatus.

37. The apparatus of claim 31, wherein:
the value associated with the first apparatus comprises a basic service set (BSS)-specific offset; and
the third identification value comprises at least a portion of an association identifier (AID).

38. A first apparatus for wireless communications, comprising:
a receiver configured to receive a message from a second apparatus, wherein the message comprises a first identification value; and
a processing system configured to:
determine a second identification value generated based on a value associated with the second apparatus and a third identification value associated with the first apparatus, wherein the third identification value associated with the first apparatus is one of a plurality of identification values assigned sequentially to a plurality of apparatuses, wherein the first apparatus is one of the plurality of apparatuses, and wherein the third identification value is one of the plurality of identification values assigned to the first apparatus;

determine, based on the first identification value and the second identification value, whether the message is intended for the first apparatus; and
process the message based on the determination.

39. The first apparatus of claim 38, wherein at least a portion of the second identification value comprises a plurality of least significant bits (LSBs) of the third identification value associated with the first apparatus.

40. A first apparatus for wireless communications, comprising:
a receiver configured to receive a message from a second apparatus, wherein the message comprises a first identification value, and to receive an indication of a value associated with the second apparatus via an association response; and
a processing system configured to:
determine a second identification value generated based on the value associated with the second apparatus and a third identification value associated with the first apparatus;
determine, based on the first identification value and the second identification value, whether the message is intended for the first apparatus; and
process the message based on the determination.

41. The first apparatus of claim 40, wherein at least a portion of the second identification value comprises a plurality of least significant bits (LSBs) of the third identification value associated with the first apparatus.

42. A method for wireless communications, comprising:
receiving, at a first apparatus, a message from a second apparatus, wherein the message comprises a first identification value;
determining a second identification value generated based on a value associated with the second apparatus and a third identification value associated with the first apparatus, wherein the second identification value is generated by adding the value associated with the second apparatus to the third identification value associated with the first apparatus;
determining, based on the first identification value and the second identification value, whether the message is intended for the first apparatus; and
processing the message based on the determination.

43. The method of claim 42, wherein the message is determined to be intended for the first apparatus if the first identification value equals the second identification value.

44. The method of claim 42, wherein:
the determination of whether the message is intended for the first apparatus comprises determining the message is not intended for the first apparatus if the first identification value does not equal the second identification value; and
processing the message based on the determination comprises terminating processing of the message based on the determination that the message is not intended for the first apparatus.

45. The method of claim 42,
wherein the determination of whether the message is intended for the first apparatus occurs in a first mode and the method further comprises:
initiating a second mode if the message is not intended for the first apparatus, wherein power consumption of the first apparatus when operating in the second mode is lower than power consumption of the first apparatus when operating in the first mode.

46. The method of claim 42, further comprising receiving an indication of the third identification value associated with the first apparatus, wherein the third identification value comprises an association identifier (AID).

47. The method of claim 42, wherein at least a portion of the second identification value comprises a plurality of least significant bits (LSBs) of the third identification value associated with the first apparatus.

48. A method for wireless communications, comprising:
receiving, at a first apparatus, a message from a second apparatus, wherein the message comprises a first identification value;
determining a second identification value generated based on a value associated with the second apparatus and a third identification value associated with the first apparatus, wherein the third identification value associated with the first apparatus is one of a plurality of identification values assigned sequentially to a plurality of apparatuses, wherein the first apparatus is one of the plurality of apparatuses, and wherein the third identification value is one of the plurality of identification values assigned to the first apparatus;
determining, based on the first identification value and the second identification value, whether the message is intended for the first apparatus; and
processing the message based on the determination.

49. A method for wireless communications, comprising:
receiving, at a first apparatus, a message from a second apparatus, wherein the message comprises a first identification value;
receiving an indication of a value associated with the second apparatus via an association response;
determining a second identification value generated based on the value associated with the second apparatus and a third identification value associated with the first apparatus;
determining, based on the first identification value and the second identification value, whether the message is intended for the first apparatus; and
processing the message based on the determination.

50. A first apparatus for wireless communications, comprising:
means for receiving a message from a second apparatus, wherein the message comprises a first identification value;
means for determining a second identification value generated based on a value associated with the second apparatus and a third identification value associated with the first apparatus, wherein the second identification value is generated by adding the value associated with the second apparatus to the third identification value associated with the first apparatus;
means for determining, based on the first identification value and the second identification value, whether the message is intended for the first apparatus; and
means for processing the message based on the determination.

51. The first apparatus of claim 50, wherein the message is determined to be intended for the first apparatus if the first identification value equals the second identification value.

52. The first apparatus of claim 50, wherein:
the determination of whether the message is intended for the first apparatus comprises the message is not intended for the first apparatus if the first identification value does not equal the second identification value; and
processing the message based on the determination comprises terminating processing of the message based on the determination that the message is not intended for the first apparatus.

53. The first apparatus of claim 50,
wherein the determination of whether the message is intended for the first apparatus occurs in a first mode and the first apparatus further comprises:
means for initiating a second mode if the message is not intended for the first apparatus, wherein power consumption of the first apparatus when operating in the second mode is lower than power consumption of the first apparatus when operating in the first mode.

54. The first apparatus of claim 50, further comprising means for receiving an indication of the third identification value associated with the first apparatus, wherein the third identification value comprises an association identifier (AID).

55. The first apparatus of claim 50, wherein at least a portion of the second identification value comprises a plurality of least significant bits (LSBs) of the third identification value associated with the first apparatus.

56. A first apparatus for wireless communications, comprising:
means for receiving a message from a second apparatus, wherein the message comprises a first identification value;
means for determining a second identification value generated based on a value associated with the second apparatus and a third identification value associated with the first apparatus, wherein the third identification value associated with the first apparatus is one of a plurality of identification values assigned sequentially to a plurality of apparatuses, wherein the first apparatus is one of the plurality of apparatuses, and wherein the third identification value is one of the plurality of identification values assigned to the first apparatus;
means for determining, based on the first identification value and the second identification value, whether the message is intended for the first apparatus; and
means for processing the message based on the determination.

57. A first apparatus for wireless communications, comprising:
means for receiving a message from a second apparatus, wherein the message comprises a first identification value;
means for receiving an indication of a value associated with the second apparatus via an association response;
means for determining a second identification value generated based on the value associated with the second apparatus and a third identification value associated with the first apparatus;
means for determining, based on the first identification value and the second identification value, whether the message is intended for the first apparatus; and
means for processing the message based on the determination.

58. A non-transitory computer-readable medium storing computer executable code, comprising:
code for receiving, at a first apparatus, a message from a second apparatus, wherein the message comprises a first identification value;

code for determining a second identification value generated based on a value associated with the second apparatus and a third identification value associated with the first apparatus, wherein the second identification value is generated by adding the value associated with the second apparatus to the third identification value associated with the first apparatus;

code for determining, based on the first identification value and the second identification value, whether the message is intended for the first apparatus; and code for processing the message based on the determination.

59. An access terminal, comprising:
at least one antenna;
a receiver configured to receive, via the at least one antenna, a message from an apparatus, wherein the message comprises a first identification value; and
a processing system configured to:
  determine a second identification value generated based on a value associated with the apparatus and a third identification value associated with the access terminal, wherein the second identification value is generated by adding the value associated with the apparatus to the third identification value associated with the access terminal;
  determine, based on the first identification value and the second identification value, whether the message is intended for the access terminal; and
  process the message based on the determination.

60. A non-transitory computer-readable medium storing computer executable code, comprising:
code for sequentially assigning a plurality of identification values to a plurality of apparatuses;
code for generating, at a first apparatus, a message comprising a first identification value, wherein the first identification value is generated based on a value associated with the first apparatus and a second identification value associated with a second apparatus, wherein the second apparatus is one of the plurality of apparatuses, and wherein the second identification value is one of the plurality of identification values assigned to the second apparatus; and
code for transmitting the message to the second apparatus.

61. A non-transitory computer-readable medium storing computer executable code, comprising:
code for generating, at a first apparatus, a message comprising a first identification value, wherein the first identification value is generated based on a value associated with the first apparatus and a second identification value associated with a second apparatus;
code for providing the value associated with the first apparatus to the second apparatus via an association response; and
code for transmitting the message to the second apparatus.

62. An access point, comprising:
at least one antenna;
a processing system configured to sequentially assign a plurality of identification values to a plurality of apparatuses and generate a message comprising a first identification value, wherein the first identification value is generated based on a value associated with the access point and a second identification value associated with an apparatus, wherein the apparatus is one of the plurality of apparatuses, and wherein the second identification value is one of the plurality of identification values assigned to the apparatus; and a transmitter configured to transmit, via the at least one antenna, the message to the apparatus.

63. An access point, comprising:
at least one antenna;
a processing system configured to generate a message comprising a first identification value, wherein the first identification value is generated based on a value associated with the access point and a second identification value associated with an apparatus; and
a transmitter configured to provide, via the at least one antenna, the value associated with the access point to the apparatus via an association response and to transmit, via the at least one antenna, the message to the apparatus.

64. A non-transitory computer-readable medium storing computer executable code, comprising:
code for receiving, at a first apparatus, a message from a second apparatus, wherein the message comprises a first identification value;
code for determining a second identification value generated based on a value associated with the second apparatus and a third identification value associated with the first apparatus, wherein the third identification value associated with the first apparatus is one of a plurality of identification values assigned sequentially to a plurality of apparatuses, wherein the first apparatus is one of the plurality of apparatuses, and wherein the third identification value is one of the plurality of identification values assigned to the first apparatus;
code for determining, based on the first identification value and the second identification value, whether the message is intended for the first apparatus; and
code for processing the message based on the determination.

65. A non-transitory computer-readable medium storing computer executable code, comprising:
code for receiving, at a first apparatus, a message from a second apparatus, wherein the message comprises a first identification value;
code for receiving an indication of a value associated with the second apparatus via an association response;
code for determining a second identification value generated based on the value associated with the second apparatus and a third identification value associated with the first apparatus;
code for determining, based on the first identification value and the second identification value, whether the message is intended for the first apparatus; and
code for processing the message based on the determination.

66. An access terminal, comprising:
at least one antenna;
a receiver configured to receive, via the at least one antenna, a message from an apparatus, wherein the message comprises a first identification value; and
a processing system configured to:
  determine a second identification value generated based on a value associated with the apparatus and a third identification value associated with the access terminal, wherein the third identification value associated with the access terminal is one of a plurality of identification values assigned sequentially to a plurality of access terminals, wherein the access terminal is one of the plurality of access terminals, and wherein the third identification values is one of the plurality of identification values assigned to the access terminal;

determine, based on the first identification value and the second identification value, whether the message is intended for the access terminal; and process the message based on the determination.

67. An access terminal, comprising:

at least one antenna;

a receiver configured to receive, via the at least one antenna, a message from an apparatus, wherein the message comprises a first identification value, and to receive, via the at least one antenna an indication of a value associated with the apparatus via an association response; and a processing system configured to:

determine a second identification value generated based on the value associated with the apparatus and a third identification value associated with the access terminal;

determine, based on the first identification value and the second identification value, whether the message is intended for the access terminal; and process the message based on the determination.

* * * * *